July 8, 1941.   E. EGER ET AL   2,248,450

VALVE STEM CAP

Filed March 18, 1939

INVENTORS
ERNST EGER
RAYMOND F. TERNES
BY
ATTORNEYS.

Patented July 8, 1941

2,248,450

UNITED STATES PATENT OFFICE 2,248,450

VALVE STEM CAP

Ernst Eger, Grosse Pointe Park, and Raymond F. Ternes, Detroit, Mich., assignors to United States Rubber Company, New York, N. Y., a corporation of New Jersey Application March 18, 1939, Serial No. 262,694

5 Claims. (Cl. 138—89.3)

This invention relates to a valve stem and cap assembly as applied to pneumatic tires, and in particular it relates to a valve stem and cap having a layer of rubber composition completely covering the exterior thereof. In valve stems, particularly for heavy service tires, it is customary to use a type of stem which is flexible or bendable in order that it may conform with various types of wheel assemblies. Because of small rim diameters of tires and the relatively large diameters of brake drums, very little clearance is provided in each instant for the valve stem. As a result, it frequently occurs that the valve stem, and particularly the conventional metal valve stem cap, rests upon the brake drum or upon other metal parts directly connected to the brake drum. The brake drums on trucks and busses encounter relatively high temperatures during the operation of the vehicle. When any metal part of the valve stem or cap rests against the brake drum or associated parts the heat therefrom is transmitted through the metal valve cap and to the valve mechanism located within the stem.

Most valve mechanisms are provided with a rubber composition sealing gasket, and any impairment of this gasket results in a leaky valve and possible failure of the tire due to its operation under improper inflation conditions. The high temperatures transmitted to the valve mechanism are harmful to the sealing gasket. Furthermore, the heat transmitted to the metal parts of the valve stem is carried along the valve stem toward the base thereof adjacent to the inner tube. The presence of excessive heat at this point is also objectionable and frequently results in failure of the assembly due to leakage in the region of the valve base. In accordance with the practice of our invention, we provide an insulating medium in the form of rubber composition covering the entire outer surface of the assembled valve stem and cap. Rubber composition, as compared with metal, has relatively high heat resisting characteristics and, consequently, heat transmitted through the cap to vital parts of the valve stem is considerably reduced.

It is among the objects of our invention to provide a valve stem and valve stem cap with a non-metallic covering therefor to resist transmission of heat; to provide a valve stem and cap which, in addition to their primary function, have a secondary seal for inflation pressure and a seal at the margins of the cap to engage the valve stem and prevent mud or other forms of grit from entering with the threaded portion of the valve stem; to provide a cap in which the sealing gasket and outer covering of rubber composition are formed integrally, thus permitting application and vulcanization of the rubber compositions in one operation; and to provide a valve stem and cap which are neat in appearance, smooth in general contour and which includes a cap surface permitting easy manipulation thereof by an operator. These and other objects and advantages will appear more fully in the following detailed description when considered in connection with the accompanying drawing, in which:

Figure 1:
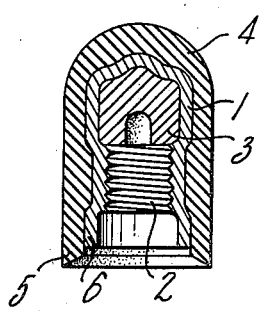
Fig. 1 is an enlarged view, in section, of a valve stem cap embodying features of our invention.
Figure 2:
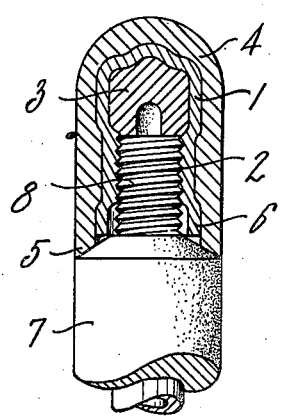
Fig. 2 is a similar view, illustrating the valve stem cap in assembly with a valve stem.

Referring to the drawing, and in particular to Fig. 1, I show a metallic valve cap 1 having threads 2 formed therein for complementary assembly with a valve stem. A conventional gasket 3 of rubber composition is located at the closed end of the cap 1 for the purpose of forming a seal with the end of a valve stem. A rubber composition 4 completely covers the outer surface of the cap 1 and is bonded thereto during the vulcanizing operation. The marginal edge 5 of the rubber composition covering 4 forms a free portion extending beyond the marginal edge 6 of the metal cap 1. The purpose of the free edge 5, as more particularly shown in Fig. 2, is to form a sealing engagement with the rubber composition of a valve stem 7, while at the same time being yieldable so as not to interfere with the seal formed between the sealing gasket 3 and the end of a threaded portion 8 of the valve stem. In other words, the sealing gasket 3 engages tightly with the end of the thread portion 8 of the valve stem, but because it is yieldable it readily allows the free edge 5 to be adjusted into association with the valve stem 7.

Figure 3:
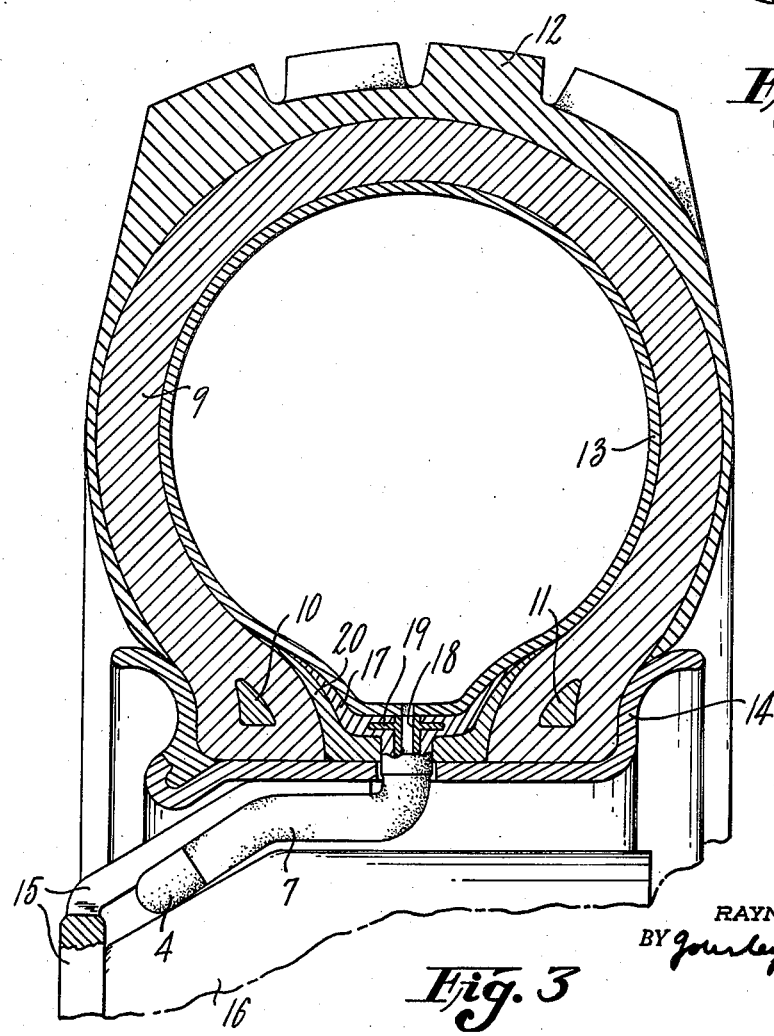
Fig. 3 is a transverse view, in section, of a pneumatic tire and wheel assembly, illustrating an application of the invention; and, Fig. 4 is an enlarged view of a modified form of a valve cap.

The application of the invention as shown in Fig. 3 illustrates an assembly including a pneumatic tire having a carcass 9, inextensible bead members 10 and 11, and a tread 12. An inner tube 13 is mounted within the tire, and the unit assembled on a rim 14. A wheel flange 15 supports the rim 14 upon a wheel hub (not shown). A brake drum 16 is secured to the wheel flange 15. The valve stem 7 includes a valve stem base 17 which is vulcanized to the inner tube 13. Within the rubber composition of the valve stem 7 is a bendable, tubular metallic core 18 extending throughout the length of the valve stem and terminating with a flange 19 at the base of the stem. The rubber composition of the valve stem also aids in insulating the core 18 from the heat generated by the brake drum. A flap 20, interposed between the inner tube 13 and rim 14 and between the valve stem base 17 and the rim 14, completes the assembly.

From the illustration, Fig. 3, it is apparent that there is very little clearance between the rim 14 and brake drum 16 for accommodating the valve stem 7. As a result, it is difficult to maintain the stem in position out of contact with the brake drum or its associated parts. Even when the valve stem is properly positioned relative to the wheel assembly, it frequently moves under ordinary operating conditions and contacts with the brake drum. The detrimental effects of the elevated temperatures to which the valve stem parts become subjected through heat transmission from the brake drum is apparent when it is considered that the operating temperature of the brake drum frequently exceeds 400° Fahrenheit. While this temperature is sufficient to scorch and impair the rubber composition at vital points, such as the valve mechanism seal and valve base assembly, outside of slight physical changes it has no detrimental effect upon the rubber composition when used merely as a covering.

Figure 4:
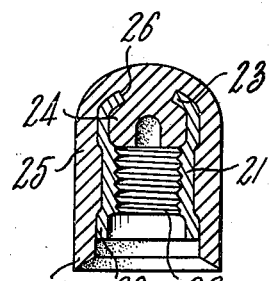

In Fig. 4 is shown a modified form of the valve stem cap of the invention, illustrating a tubular member 21 having internal threads 22 for complementary association with the threaded portion of the valve stem. The upper marginal end 23 of the tubular member 21 is turned inwardly to provide a support for a gasket member 24 located within the tubular member 21. The outer surface of the tubular member 21 is covered with a layer of rubber composition 25 vulcanized in bonded relation with the member 21. The partially restricted opening 26 at the upper end of the tubular member 21 permits the rubber composition of the sealing member 24 and of the covering 25 to merge together in a unitaray construction. By this arrangement it is possible in a single operation to assemble and vulcanize both members 24 and 25 in bonded relation with the tubular member 21. Free edge 27, forming a part of the covering 25, extends beyond the edge 28 of the tubular member 21, thus permitting an adjustable seal of the free edge 27 with the valve stem and of the sealing member 24 with the end of the valve stem.

As thus shown and described, we have provided a simplified form of valve stem and cap construction which is economical of manufacture and which, when forming a part of the tire and wheel assembly, lends itself as a safety feature in preventing tire failures.

It is to be understood that the invention is susceptible to those modifications which appear obvious and which appear within the scope of the appended claims.

Having thus described our invention, what we claim and desire to protect by Letters Patent is:

1. A cap for a tire valve stem comprising a tubular member having internal threads, one end of said tubular member having transverse wall portions enclosing an opening of less size than the opening at the opposite end, and a layer of rubber composition bonded to the entire outer surface of the tubular member and having a portion thereof extending inwardly through said lesser end opening, of the tubular member to form a sealing gasket for the end of a valve stem, said gasket being supported by the inner face of said transverse end wall portions against the thrust of said valve stem.

2. A cap for a tire valve stem comprising a tubular member having openings at its opposite ends and provided with intermediate internal threads, a layer of rubber composition bonded to and completely covering the outer surface of the tubular member, and a sealing gasket of rubber composition forming a closure at one of said open ends of the tubular member and joined integrally with said layer of rubber composition.

3. A cap for a tire valve stem comprising a rigid tubular member having internal threads, a layer of rubber composition bonded to and completely covering the outer surface of the tubular member, inwardly extending flange portions formed at one end of the tubular member, and a sealing gasket of rubber composition forming a closure at the reduced end of the tubular member and joined integrally with said layer of rubber composition.

4. A cap for a tire valve stem comprising a rigid tubular member having internal threads, a layer of rubber composition bonded to and completely covering the outer surface of the tubular member, inwardly extending flange portions formed at one end of the tubular member, and a sealing gasket of rubber composition forming a closure at the reduced end of the tubular member and joined integrally with said layer of rubber composition, said layer of rubber composition having free edges extending beyond the rim of the tubular member opposite its reduced end.

5. A cap for a tire valve stem comprising a tubular member having internal threads, one end of said tubular member having transverse wall portions extending inward toward the major axis of said cap, a layer of rubber composition bonded to the entire outer surface of the tubular member including said transverse wall portions, and an inner sealing gasket for the end of a valve stem enclosed by said transverse wall portions, said gasket being supported by the inner face of said transverse wall portions against the thrust of said valve stem, and said outer layer of rubber composition being supported over the free end of said cap by the exterior face of said transverse wall portions, said tubular member and exterior bonded layer constituting an integrated structure serving as a heat-insulating gland for the end of the valve-stem, being removable readily therefrom as a unit and replaceable as such, at will.

ERNST EGER.
RAYMOND F. TERNES.